UNITED STATES PATENT OFFICE.

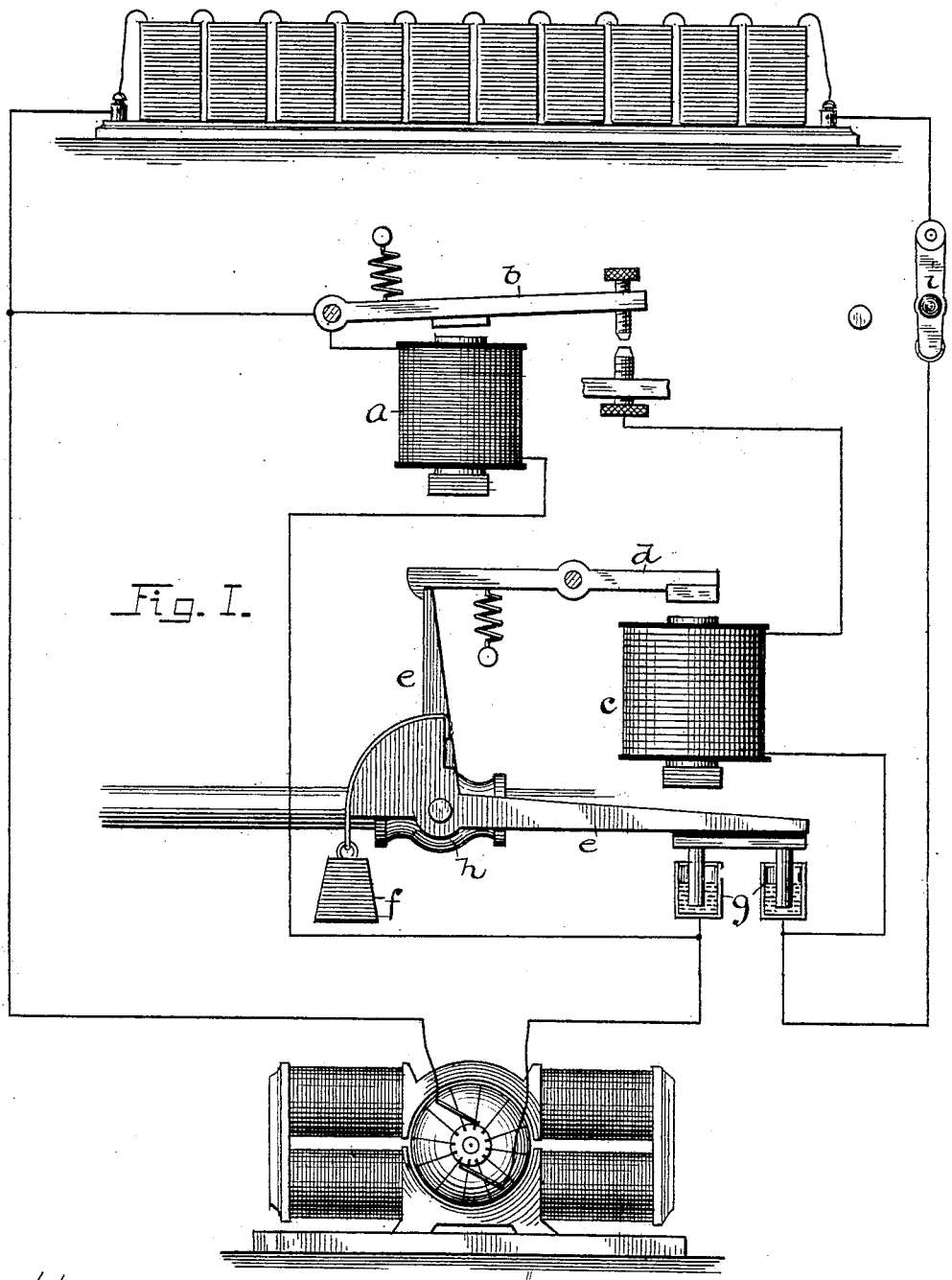

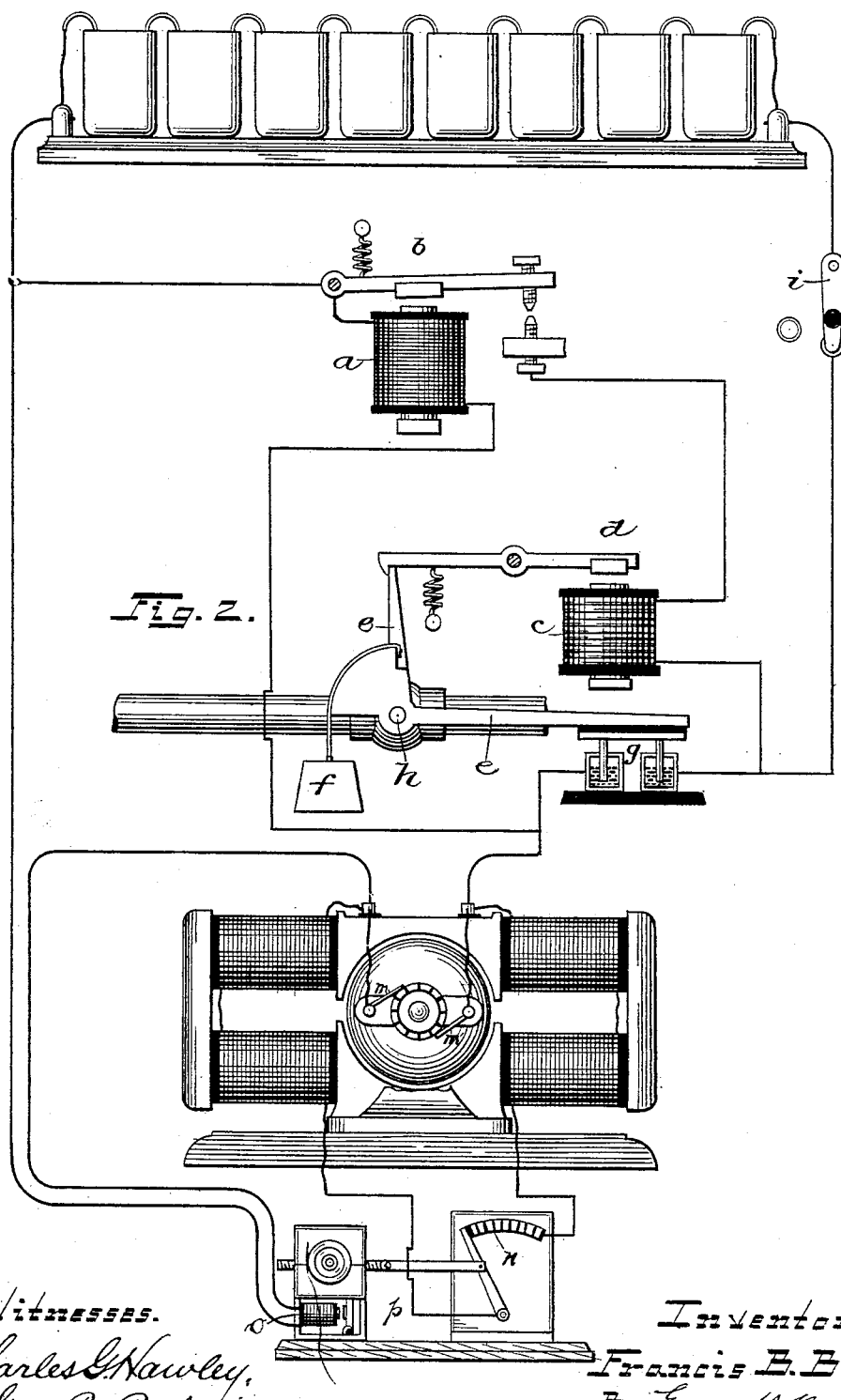

FRANCIS B. BADT, OF CHICAGO, ILLINOIS, ASSIGNOR TO THE WESTERN ELECTRIC COMPANY, OF SAME PLACE.

AUTOMATIC ELECTRIC CUT-OUT.

SPECIFICATION forming part of Letters Patent No. 493,672, dated March 21, 1893.

Application filed June 6, 1889. Serial No. 313,395. (No model.)

*To all whom it may concern:*

Be it known that I, FRANCIS B. BADT, a subject of the King of Prussia, residing at Chicago, in the county of Cook and State of Illinois, have invented a certain new and useful Improvement in Automatic Electric Cut-Outs, (Case No. 7,) of which the following is a full, clear, concise, and exact description, reference being had to the accompanying drawings, forming a part of this specification.

My invention relates to cut outs and is especially applicable to systems of incandescent lighting in which storage batteries are employed in connection with a gas engine and dynamo. By its use the engine may be shut down and the dynamo disconnected from the circuit when the storage battery is sufficiently charged. The necessity of an attendant to watch the charging of the battery is therefore obviated.

It is obvious that such an arrangement is especially desirable for moderate sized isolated plants. In the operation of such plants the incandescent lamps are supplied with current from a storage battery, the battery being charged by means of a dynamo which is run by a gas engine. It is not desirable and practicable to run a gas engine twenty four hours a day in order to get light at any time desired and on this account it has been found of advantage to charge the storage battery during the day so as to supply the incandescent lights with current at all times desired.

The objection to this practice has been that considerable attention has been required to watch the dynamo and engine so as to shut down the engine and disconnect the dynamo from the circuit when the storage cells are fully charged. It is necessary to open the circuit from the dynamo before shutting down the gas engine as otherwise the current from the storage battery will run in opposition in the reverse direction through the dynamo and thus convert the dynamo into a motor.

My invention is designed to do this work automatically which has heretofore required personal attendance.

My invention is illustrated in the accompanying drawings, in which

Figure 1 shows a storage battery, a dynamo electric machine in circuit therewith, together with the gas pipe leading to the gas engine together with electro magnetic devices for opening the circuit of the dynamo machine and immediately thereafter closing a valve in the gas pipe automatically by the action of the current from the storage battery when the same is fully charged. Fig. 2 is a view illustrative of my invention as used in connection with a shunt wound dynamo electric machine provided with an automatic regulator to keep the current strength constant.

In order to obtain all these desirable results, I put the fine wire coil $a$ in shunt with the storage battery and dynamo. This fine wire coil, which is of very high resistance, say two to ten thousand ohms, acts as a volt meter and attracts the armature lever $b$ as soon as the electrical pressure has reached the normal maximum. This fine coil cannot exert any great power and simply closes a contact by the movement of its armature. As soon as this contact is closed the current will pass through the powerful coil $c$. This coil, in turn, will attract the pivoted lever $d$ which will release the bell crank $e$. As soon as the upper end of the bell crank $e$ is released the weight $f$ will turn this bell crank and break, first, the connection between dynamo and storage battery at $g$ and immediately after close the valve $h$ in the gas pipe. This valve $h$ may be either the main gas cock of the gas service pipe, running to the gas engine or it may be a valve adapted to shut off the supply of gas for the burner or incandescent metal rod, which ignites the explosive mixtures in the engine cylinder. Or again in any gas engine, in which the explosion is caused by the electric spark, the electric spark apparatus may be switched out by the movement of the bell crank $e$ or other device controlled by electro magnetic device $c$. I prefer, however, to put this device on the valve of the service pipe of the gas engine for the reason that if it should be attached to the above mentioned other devices, it would have the disadvantage that the gas engine will make a few revolutions before stopping and use a quantity of gas, without doing useful work.

I do not confine my invention to the special named devices, but to any devices, which are used in a combination of the storage battery with a dynamo and a gas engine to obtain the results above mentioned, viz: automatically shutting down first the dynamo, then the gas engine when the storage battery is fully charged. The switch $i$ shown in the drawings is used when starting up the engine. The valve $h$, of course, must be in position as shown in the drawings; that is to say, open. The dynamo circuit leading to the storage battery must be opened by means of switch $i$ until the dynamo is up to the necessary speed when generating the necessary electro-motive force. The switch $i$ must be closed so as to connect the dynamo to the storage battery. Afterward no further attention will be needed and the apparatus will act automatically as explained. I prefer in this combination, a shunt wound dynamo with automatic regulator to keep the current strength constant as shown in Fig. 2. In this figure are shown the fine wire coil $a$, in shunt of the battery, the coil $c$ and the cut-off valve $h$ and switch $g$ operated thereby, as in Fig. 1. These are connected with a dynamo having field coils of high resistance, in shunt of the brushes, $m$ $m'$, and included in circuit with an adjustable resistance $n$. The electro magnet $o$ of the constant current regulator $p$ is included in the main circuit, between the dynamo and the storage battery, and acts to adjust the resistance of the rheostat $n$ to keep the current constant. As the counter electro-motive force of the storage battery will gradually increase while the latter is being charged, the current strength will be kept constant by an automatic regulator operating a resistance which is put in the field circuit. The electro motive force of the dynamo will gradually increase with that of the storage battery, and when this electro motive force reaches its maximum point the electro magnetic device $a$ will be operated to close the circuit through the coil of the electro magnet $c$ as before described.

My invention admits of various modifications that would readily suggest themselves to those skilled in the art. I have shown the bell crank lever $e$ provided with a weight for moving the same when released by the movement of armature lever $d$. Any other well known means for causing the cut outs $g$ to be opened and the valve $h$ to be closed when the lever $d$ is moved might be employed. I therefore do not limit myself to the details of construction shown.

Having thus described my invention, I claim as new and desire to secure by Letters Patent—

1. The combination, with a storage battery and a dynamo electric machine for charging the same, of a high resistance electro-magnetic circuit closing device adapted to be operated when the battery is fully charged, a circuit controller and mechanism adapted to open the circuit of the storage battery and dynamo, and to close an engine valve, substantially as and for the purpose specified.

2. The combination with the storage battery in the circuit of a dynamo electric machine for charging the same, of a shunt circuit connected around said storage battery including an electro magnetic circuit closing device of high resistance normally included in said shunt circuit and adapted to be operated by the action of the counter electro motive force when the battery is sufficiently charged to cut out the high resistance of said circuit closing device and an electro magnetic valve and circuit controlling mechanism adapted to be included in said shunt circuit which is brought into operation when said high resistance is shunted, substantially as and for the purpose specified.

In witness whereof I hereunto subscribe my name this 29th day of April, A. D. 1889.

FRANCIS B. BADT.

Witnesses:
ELLA EDLER,
GEO. R. PARKER.